Dec. 13, 1949     B. B. SCOTT, JR     2,490,837
WIRE LAYING DEVICE AND METHOD
Filed June 5, 1946                    2 Sheets-Sheet 1

INVENTOR.
BENJAMIN B. SCOTT, JR.
BY
William D. Hall.
ATTORNEY

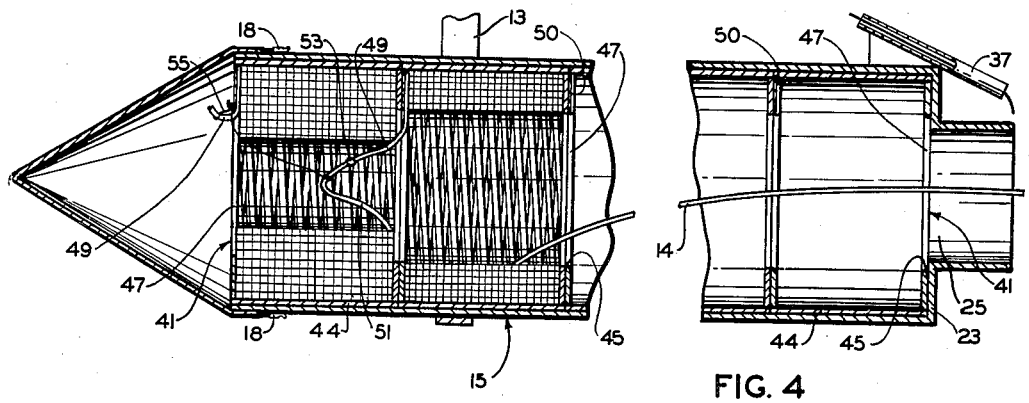
FIG. 4
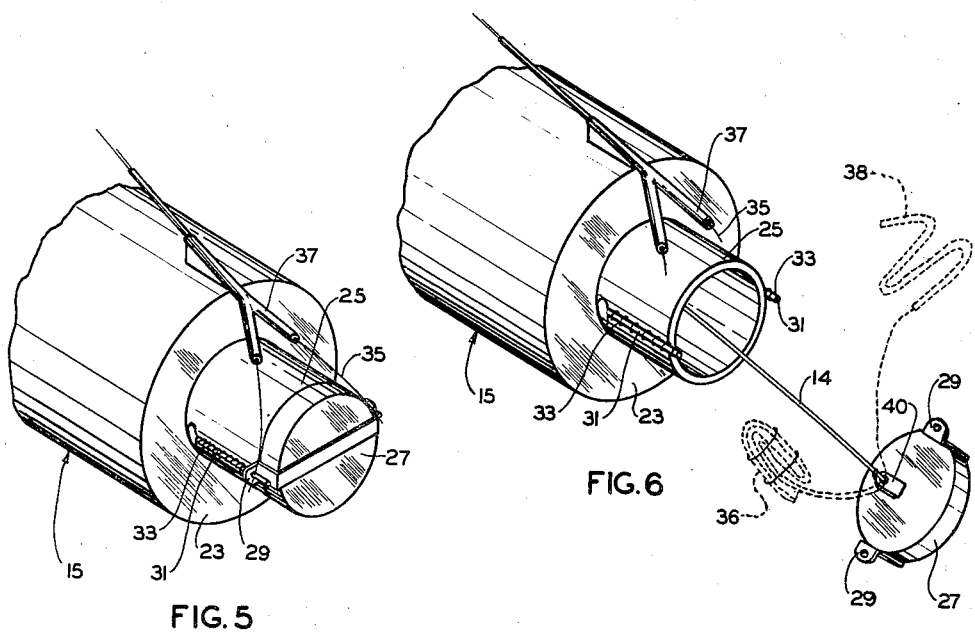
FIG. 5
FIG. 6
*INVENTOR.*
BENJAMIN B. SCOTT, JR.
BY
William D. Hall
ATTORNEY

Patented Dec. 13, 1949

2,490,837

UNITED STATES PATENT OFFICE 2,490,837

WIRE LAYING DEVICE AND METHOD

Benjamin B. Scott, Jr., Pittsburgh, Pa.

Application June 5, 1946, Serial No. 674,413

3 Claims. (Cl. 244—137)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates to improvements in wire laying and the like.

Needs have arisen for laying long lengths of wire at high speed. This is extremely important in military operations where it is necessary to set up telephone or telegraph communications over relatively large areas in the shortest possible time, and the problem is particularly pressing where the areas include difficult country, such as broken hills, mountains, jungles, swamps, successive land and water areas, etc.

In the past the method used in laying such wire has been the extremely slow one of crossing the country by foot, or by a suitable relatively slowly moving motor vehicle, and unwinding the wire from reels. Not only is this system slow but it requires considerable heavy equipment including the reels and the supports to sustain said reels so as to allow them to rotate freely while they are being unwound, thereby greatly reducing or impairing operational scope. In addition, this conventional system of wire laying is dangerous to military personnel in front line areas as the noise of unwinding the reels may be heard by the enemy.

Again, experience has proved that it is impractical to lay wire from reels at high speeds because of the necessity of rotating the reels and unwinding the wire at such speeds. Also in laying wire from reels, it has been necessary to stop at the end of each reel to splice on the next reel. In addition, should it be desired to communicate through the wire during the laying operation, it is neecssary to suspend the laying entirely during communication to allow a telephone or the like to be connected to the wire. Experience has also demonstrated that certain special military tactical installation requirements are not possible at all with conventional laying equipment and methods.

In order to overcome these deficiencies, I developed coils of wire, packages for said coils and methods of coil winding and laying (as more specifically described in my copending applications, Serial Numbers 674,410, 674,411 and 674,412) which coils are well adapted for laying at high speeds as well as low, which may be laid with no moving parts, which do not require heavy reels or unwinding equipment, and which are noiseless in operation so that they are well adapted for laying by various means such as by a man on foot, by pack dog or horse, from motor vehicles, boats or aircraft, by use of rockets, etc.

It has been found, however, that there are practical limitations to the amount of wire which can be advantageously wound on a single coil in a single package and hence it is desirable that a simple method and means be devised of uninterruptedly laying a plurality of such coils, connected in series, particularly adapted to laying at high speeds, as from a motor vehicle or airplane.

It is therefore an object of the present invention to provide a method and means of joining coils of wire and the like in series so that they may be laid successively without interruption.

It is a further object of this invention to provide a wire laying device for holding a plurality of such coils of wire or the like to allow seriatim laying thereof.

It is still another object to provide wire laying apparatus which may be used for laying wire (from one or a plurality of coils) from aircraft without interfering with the operation of the aircraft and without damage to the wire.

These and other objects and advantages of my present invention, which will be better understood as the detailed description thereof progresses, are obtained in the manner set forth hereinbelow.

In the present application, the invention will be illustrated in connection with coils of insulated electrical wire, for telephone and telegraph communication, but it will be understood that the invention is applicable to many other elongated coilable materials, such as rope, twine, flexible tubular conduit for electrical wires, multiple conductor cables, uninsulated wire, flexible stranded wire rope, etc., and hence should not be deemed to be limited to the illustrated embodiment.

As used in the present application, the word "coils" shall be used in its broadest sense, and shall be deemed to include any and all types of windings of elongated materials (such as rope, wire, etc.), wherein the said material is wound about an axis, irrespective of the geometrical shape (as spherical, cylindrical, etc.) and irrespective of the type of winding (as level layer wound, honeycomb, etc.) and irrespective of the pitch at which the turns are wound.

I provide an elongated hollow container in which a plurality of coils of wire (or rope or any other elongated material) may be positioned in tandem, with the ends of the wire in said coils spliced serially so as to form one continuous length of wire. For such tandem laying, the end of the outermost turn of wire of each coil is brought down on the inside of the coil package and then out, where it is spliced to the end of the innermost turn of the next succeeding coil. The container is secured in a suitable position, preferably substantially parallel to the axis of motion, to an airplane, motor vehicle or the like. The rear end of said container is pierced by a pay-out aperture through which the wire of said coils may be fed out. A weight is attached to the free pay-out end (the inner end) of the rearmost coil in said container and means are provided for releasably retaining said weight. At the proper time said weight is released and it drops and pulls the end of the wire out with it so that the wire of all the coils in succession may be payed out.

Although the present invention may conceivably be used with coils wound without "turn-to-turn restraint," "turn-to-package restraint" and/or "pretwist," it is believed that satisfactory operation is best achieved with coils so wound, as the paying out of the wire is then smooth and without the likelihood of knots, snarls, lay twist, deformations, abrasions, etc. For a full description and explanation of "turn-to-turn restraint" and "turn-to-package restraint," see my copending application, Serial Number 674,411, and of "pretwist," see my copending application, Serial Number 674,412.

In the accompanying specification there is described, and in the annexed drawings illustrated, what are at present considered preferred embodiments of the invention. It is however to be understood that said invention is not to be limited to said embodiments inasmuch as changes may be made without the exercise of invention and within the true spirit and scope of the apended claims.

In the drawings, Figure 1 is an elevational view of a wire laying apparatus, embodying the present invention, wherein the container is secured to the outside of an airplane, the parts being shown before the laying operation has begun;

Figure 4 is a still further enlarged sectional view, similar to Figure 2, except that the coils are also shown in section, illustrating the parts during the laying operation;

Figure 5 is an enlarged perspective view of the rear, pay out end of the apparatus of Figure 1 before the wire laying operation has begun; and Figure 6 is a similar perspective view at the moment when the weight is released and the wire is starting to pay out.

Figure 1:
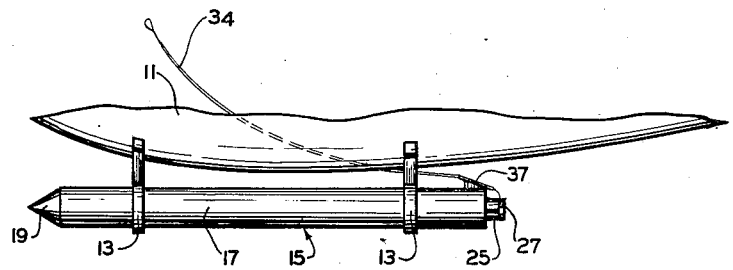

Referring now more particularly to the drawings, the aircraft wire laying apparatus shown may be suitably secured to an aircraft 11, as by a pair of brackets 13. It will be understood that the apparatus may be secured in any one of various ways and in various positions outside the fuselage (such as to wing struts, under the wings, etc.), although I find that a position below the fuselage is preferable because the slipstream then tends to counteract gravity and assists in causing the wire 14 to be fed out in a relatively straight line until it is beyond the airplane. The apparatus may also be installed in a bomb rack of an airplane and lowered to the outside of the plane through the bomb-bay only when the wire 14 is actually to be payed out.

The laying apparatus is made up of a container 15 which includes an elongated cylindrical body 17, preferably of sheet metal. Said body 17 terminates at its forward end in a removable conical loading head 19 held in place by several catches 18.

At its rear, or pay-out end, said body 17 is provided with a flat annular rear wall 23, to the inner periphery of which may be secured a short, rearwardly extending tubular compartment 25. The open rear end of said compartment 25 is closable by a circular release plate 27 provided with two apertured ears 29 extending radially outwardly therefrom.

Secured to two diametrically opposite points on the outside of the compartment 25 are a pair of rearwardly extending guide rods 31 which extend through the apertured ears 29 when the release plate 27 is installed in its closed position (see Figure 5). A pair of helical springs 33 are wound respectively about the said guide rods 31, the forward ends of said springs being anchored to said rods to avoid separation therefrom.

The rear extremity of each guide rod 31 is pierced by a diametrically positioned release hole receivable to one of the release wires 35. The two release wires 35 extend, slidably, through a Y-shaped tube 37 which is secured to the upper surface of the body 17 at its rear end. The forward ends 34 (Figure 1) of said release wires 35 extend up into the airplane 11, from where they may, at the proper time, be pulled by an operator to release the release plate 27 and begin the laying operation.

The release plate 27 may be of sufficient weight to effect the paying out of the wire 14, but for more satisfactory operation, particularly when it strikes the ground, I prefer to secure a short length of chain 36 (shown in broken lines) to the said plate 27. Said chain 36 should be tied into a compact bundle with light twine which will break when it strikes the ground. A small parachute 38 (shown in broken lines) may also be secured to the plate 27 to snub forward movement of the plate 27 and the chain 36 and the end of the wire 14 secured thereto. Thus the forward speed of said parts are so reduced that, when they strike the ground, the wire 14 is dragged along the ground very little if any, thereby preventing damage or strain to said wire. Both the chain 36 and parachute 38 are placed in the compartment 25, the purpose of which compartment is to keep said parts intact and protected from buffeting by the air until the plate 27 is released. The inner surface of the plate 27 is provided with a tie ring 40 to which the chain 36 and parachute 38 may be fastened.

Figure 2:
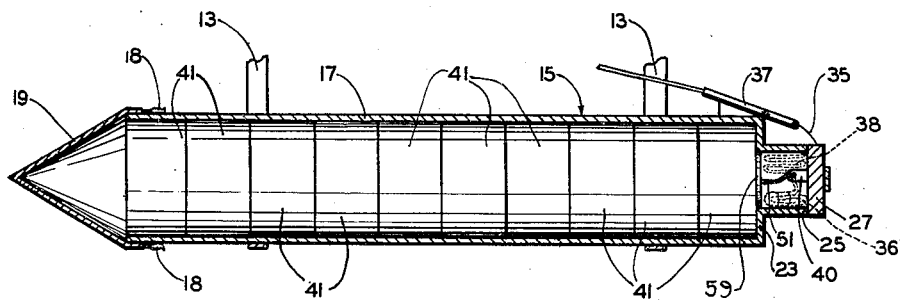
Figure 2 is an enlarged longitudinal vertical sectional view of the apparatus shown in Figure 1, the coils being shown in elevation.

As may be seen in Figures 2 and 4, a plurality of suitably packaged coils 41 of wire 14 are positioned in tandem, in abutting relationship, within the body 17 of the container 15. Said coils 41 are the type which are wound so as to leave an axial cavity and which are payed out from the inside (and which are preferably the type of coil described and illustrated in my copending applications, Serial Numbers 674,411 and 674,412).

Figure 3:
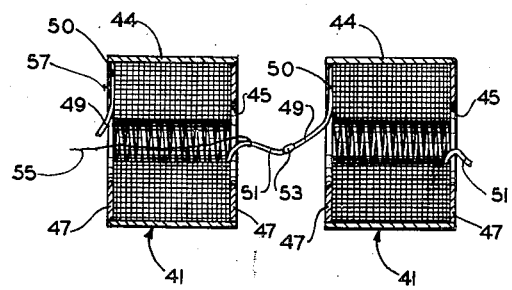
Figure 3 is a further enlarged, sectional view of two of the coils of Figure 2 in the process of being coupled together before being positioned in the container.

Each of said coils 41 is packaged in a cylindrical housing (preferably of the type disclosed in my copending application, Serial Number 674,410 and illustrated in Figures 1-3 thereof) which comprises two annular end members 47 and a cylindrical wall 44, sufficiently resistant to longitudinal compressive forces to prevent telescoping of the several coil housings. Each of said end plates 47 is pierced by a relatively large circular pay-out aperture 45. It will be noted that, in the construction of each of the packaged coils 41, the outer end 49 of the wire 14 extends along a slot 50 along the inner surface of one of the end members 47, and then outwardly through one of the apertures 45.

In connecting the coils 41 in series (as shown particularly in Figures 3 and 4), the outer end 49 of the wire 14 of one coil 41 is connected to the inner end 51 of the next succeeding coil 41 in a secure but smooth splice 53. The ends of the two successive packaged coils 41 are then placed so that their end members 47 are in abutment and the loop of loose wire (made up of the inner end 51 of the wire 14 of one coil 41 and the outer end 49 of the other coil 41 and the splice 53 between them) is suitably pulled away from the one of said two coils 41 which is to be payed out first so as not to become entangled during the paying out of said first coil 41. This is preferably accomplished by pulling said loop of wire into the axial cavity of the second of said coils 41 to be payed out and said loop is then tied back in that position by a piece of light, easily broken, twine 55 which may be secured to a thumbtack 57 affixed to the forward end member 47 of the said second coil 41.

When all of the packaged coils 41 have been spliced together and the loops of wire joining them have been tied safely out of the way, as just described, said coils 41 are positioned in tandem within the body 17 of the container 15. The inner end 51 of the rearmost coil 41 is then secured to the tie ring 40 on the inside of the release plate 27. The said release plate 27 is locked in its closed position by inserting the guide rods 31 through the apertured ears 29 and slipping the extremities of the release wires 35 through the holes in said rods 31, thereby compressing the springs 33, which thereafter keep the release wires 35 in place until they are forceably retracted by being pulled from within the airplane 11 by an operator.

In the operation of the apparatus just described the container 15 may be secured to an airplane 11 by means of the brackets 13 or any other suitable means. One advantage of the present invention is that it may be readily attached or detached from an airplane 11, thus allowing the airplane to be used for other purposes than wire laying.

Either before or after the container 15 is attached to the airplane 11, the conical head 19 is removed and one or more packaged coils 41 are positioned within the body 17 of said container 15 through the open forward end thereof. If more than one coil 41 is to be laid, they are spliced together in series and the loops of wire between successive coils 41 tied out of the way, as by twine 55, as already described and the inner, pay-out end 51 of the rearmost coil 41 is secured to the tie ring 40. If fewer coils 41 are used for a particular laying operation than the container 15 is able to accommodate, the forward end of said container should be filled with empty coil housings or other suitable means should be used to wedge the loaded coils 41 in place. The conical head 19 is then reinstalled.

The release plate 27 is then secured in place to close the compartment 25, as already described. If a chain 36 and/or parachute 38 are to be used, they may be secured to the tie ring 40 and placed within the compartment 25 before installing said release plate 27. If a chain 36 and/or parachute 38 are used, I find it advisable to wedge a disc 59 of cardboard or the like into said compartment 25 at its forward end, so as to keep said chain 36 and/or parachute 38 from sliding into the cavity of the rearmost coil 41. The airplane 11 may now take off.

When the plane 11 has reached the locality where the laying operation is to begin, it should preferably be flown at as low an altitude and at as slow a speed as can conveniently and safely be done. Just before the point, from which the wire 14 is to be laid, is reached, an operator, from within the airplane 11, pulls the release wires 35. Thereupon the release plate 27 is caused, by means of the springs 33, to spring off the rods 31 and is carried aft, pulling the chain 36 and parachute 38 (if they are being used) and also the inner pay-out end 51 of the rearmost coil 41 with it, thus causing the wire 14 of said rearmost coil 41 to pay out from the inside thereof.

The release plate 27 and the chain 36 drop to earth, taking the said end 51 of the wire 14 with them. As the chain 36 strikes the ground the light string which is tied about it breaks and the chain extends along the ground to form a ground drag or anchor to prevent the wire 14 from being pulled along the surface of the earth which might damage it. If a parachute 38 is used, it opens up as soon as it leaves the compartment 25 and slows down the forward speed of the plate 27 and chain 36 and also thus acts as a drag in the air to help pull the wire 14 from the coils 41.

When all of the wire 14 of said rearmost coil 41 has been payed out, the loop of wire joining said rearmost coil 41 to the second coil 41 will be pulled, thus readily breaking the twine 55 and allowing the second coil 41 to be payed out. This second coil 41 pays out through the apertures 45 of the empty housing of the first coil 41.

This process continues until all of the coils 41 have been payed out successively. The purpose of the twine 55 will now become apparent. Each such piece of twine 55 holds one of the loops of connecting wire out of the interior of the coil 41 which is being payed out so that said loop is not pulled out ahead of time so as to cause two coils to be payed out simultaneously and result in a snarl.

It will now be seen that, by the foregoing method and apparatus, a plurality of coils 41 in tandem may be payed out successively at relatively high speeds. The cylindrical walls 44 of the coils 41 must, of course, be sufficiently strong so that the wire 14 of each of the coils 41 can be payed out in turn without the telescoping of any of the empty coil housings, which would interfere with the operation. The annular end members 47 of the coils 41 should preferably be of small width in a radial direction so as to have large pay-out apertures 45, whereby to minimize the possibility that the wire 14 being payed out will be damaged by rubbing up against the edges of said apertures 45 at high speed. Said end members 47 should have sufficient radial width however so as to prevent telescoping of the several housings. The tubular compartment 25 should also be of as large a diameter as possible for the same reason.

Although the present invention has been described above in connection with the laying of communication wire, it will, of course, be understood that it may be used for various other purposes, such as for instance, for the laying of a rope between a stranded vessel and the nearest shore to assist in the setting up of a breeches buoy or the like. The invention may also be used for paying out wire rope or other elongated materials from a motor vehicle, boat, etc., as well as from an airplane.

While there has been described what is at present considered a preferred embodiment of my invention, it will be obvious to those skilled in the art that many changes and modifications may be made therein without departing from the invention, and it is aimed in the appended claims to cover all such changes and modifications as fall within the true spirit and scope of the invention.

What I claim is:

1. In an apparatus for laying wire from a plurality of coils thereof, a container comprising a tubular body receivable to a plurality of said coils positioned in tandem, a removable head on the forward end of said body, an annular wall secured to the rear end of said body, a tubular compartment secured to and extending rearwardly from said annular wall, a plate releasably secured to the rear end of said compartment, and means to release said plate.

2. In an apparatus for laying wire from an aircraft, an elongated cylindrical body secured to the outside of said aircraft substantially parallel to the line of flight thereof, a head removably secured to the forward end of said body, an annular wall secured to the rear end of said body, a tubular coaxially disposed compartment secured to and extending rearwardly from said wall, a pair of guide rods extending longitudinally alongside said compartment and pierced with holes near their rear ends, a release plate to close the rear end of said compartment, apertured ears secured to said plate and positioned to receive said guide rods, a pair of release wires positionable through the holes in said guide rods, and spring means to urge the ears against said release wires and to release the release plate when the said wires are withdrawn.

3. The method of laying elongated material from at least first and second coils, of the type which have axial cavities therethrough and feed out through said cavities and are packaged so as to have a pay-out aperture through each end of the package substantially in register with said axial cavity, comprising the steps of positioning the packaged coils in coaxial tandem relationship, securing said coils against relative longitudinal movement, bringing the outer end of the material of the first coil out of its package through its pay-out aperture which is adjacent said second coil and joining it to the inner end of the material of the second coil, and securing said joined ends, by a readily releasable means, out of the way of said first coil and its package.

BENJAMIN B. SCOTT, Jr.

REFERENCES CITED

The following references are of record in the file of this patent:

UNITED STATES PATENTS

| Number | Name | Date |
| --- | --- | --- |
| 1,495,174 | Harmon | May 27, 1924 |
| 2,138,970 | Jones | Dec. 6, 1938 |
| 2,243,551 | Daly | May 27, 1941 |
| 2,328,208 | Friedman | Aug. 31, 1943 |
| 2,380,587 | Fenton | July 31, 1945 |
| 2,382,442 | Rich et al. | Aug. 14, 1945 |
| 2,436,402 | Potter | Feb. 24, 1948 |

FOREIGN PATENTS

| Number | Country | Date |
| --- | --- | --- |
| 407,786 | Great Britain | Mar. 29, 1934 |
| 454,555 | Great Britain | Oct. 1, 1936 |